United States Patent [19]

Wagner et al.

[11] 4,027,067

[45] May 31, 1977

[54] ANTI-BLOCKING TREATMENT FOR TACKY PARTICLE-FORM POLYMERS USING AQUEOUS COMPOSITION OF POLYHYDROCARBYLSILOXANE AND ALKALI METAL SALT OF HIGHER CARBOXYLIC ACID

[75] Inventors: Paul H. Wagner; Mason S. Wilt, both of Borger, Tex.

[73] Assignee: Phillips Petroleum Company, Bartlesville, Okla.

[22] Filed: Feb. 26, 1976

[21] Appl. No.: 661,682

[52] U.S. Cl. .............................. 428/407; 260/18 S; 260/29.2 M; 260/29.1 SB; 427/212; 427/222; 427/385 B; 427/387; 526/29

[51] Int. Cl.² ..................... B44D 1/22; C08L 91/00

[58] Field of Search .............. 260/29.2 M, 29.1 SB, 260/18 S, 23.5 A, 23.7 M; 526/29; 427/387, 376 A

[56] References Cited

UNITED STATES PATENTS

| 2,939,898 | 6/1960 | Aron | 260/23.7 M |
|---|---|---|---|
| 3,541,196 | 11/1970 | Gilbert | 264/99 |
| 3,658,744 | 4/1972 | Brindell et al. | 260/23.7 M |
| 3,703,491 | 11/1972 | Takayama et al. | 260/23.7 M |
| 3,900,617 | 8/1975 | Grenoble | 427/387 |

FOREIGN PATENTS OR APPLICATIONS

| 1,191,289 | 5/1970 | United Kingdom | 260/29.2 |

*Primary Examiner*—Harry Wong, Jr.
*Assistant Examiner*—Peter F. Kulkosky

[57] ABSTRACT

Tacky particle-form polymers are treated with a silicone/water/alkali metal caboxylate emulsion.

32 Claims, No Drawings

ANTI-BLOCKING TREATMENT FOR TACKY PARTICLE-FORM POLYMERS USING AQUEOUS COMPOSITION OF POLYHYDROCARBYLSILOXANE AND ALKALI METAL SALT OF HIGHER CARBOXYLIC ACID

FIELD OF THE INVENTION

The invention relates to treatment of tacky particle-form polymers to reduce tendency of the particles to stick together. In another aspect, the invention relates to methods to improve storage life of particle-form polymers. In a further aspect, the invention relates to novel anti-block treating compositions.

BACKGROUND OF THE INVENTION

Many polymers, particularly synthetic elastomers, are produced for commercial consumption in a particulate-form such as pellets, granules, briquettes, pills, spheres, crumb, and the like, either by deliberately forming into various shaped particles, or as a natural result of various recovery and drying operations in the polymer production process. The particulate-form of a polymer is convenient and desirable for many purposes since such particles are more readily compounded with other polymers, such as elastomers with resins to make high impact resins, or dissolved in various monomers for use in graft copolymerizations, or more readily dissolved in oils to make high viscosity lubricating oils, and the like. The particle-form of a polymer is much more readily handled for such further uses than are large blocks of polymer, or sheet, or the like.

Unfortunately, the convenient-to-use particles of many polymers, particularly those exhibiting any elastomeric character, tend to stick together, to be tacky, to agglomerate, to exhibit "blocking", which is an undesired adhesion between touching particles such as occurs under moderate pressure during storage. Particularly, storage under somewhat elevated temperatures, and under pressures caused by stacking bales or packages of polymer, create conditions favorable for such agglomeration. If the particles of the polymers agglomerate, then it frequently becomes necessary to grind, crush, or otherwise masticate the mass in order to re-separate the particles or to again produce a utilizable particulate material. Such mechanical treatment is burdensome and undesirable because of inconvenience, added labor and time, cost, possible contamination of the elastomer, and possibly in some instances even degradation of some of the polymeric products due to the additional working, temperature, and the like.

Some attempts to ease the problem have applied a dusting agent such as carbon black, talc, zinc stearate, rice flour, chalk, magnesium oxide, infusorial earth, or the like, to the particles in an effort to counteract the natural tackiness or blockiness of the particulate-form polymers. All of these dusting agents, however, have some objectionable characteristics. For example, adding color to the natural polymer may be undesirable for some purposes. The dusting agents themselves may be objectionable for some end-uses, such as lube oils for modern engines which are subject to rigourous specifications and limitations as to contaminants which may adversely affect the performance of the lube oil or may add undesirable insolubles or residues. Silica powder and some grades of talc may possibly pose health hazards under some circumstances that will restrict their use. Stearate powders at levels to be anti-tacky may adversely affect polymer performance properties such as tack, adhesion, optical clarity, and the like.

Needed is an anti-blocking treatment for normally tacky particulate-form polymers that can be easily added, readily controlled, employed in relatively small amounts, and be noncontaminating for most end-uses, yet produce highly effective results.

BRIEF SUMMARY OF THE INVENTION

Unexpectedly, we have discovered a method of treating normally tacky particulate-form polymers which substantially reduces the blocking tendencies thereof. The anti-block treatment that we have discovered comprises a silicone fluid/alkali metal carboxylate/water emulsion. Surprisingly, it is this combination as described which is so effective, since other emulsifiers did not result in effective anti-sticking treatments.

This treating composition can be readily applied to the particulate-form elastomers, readily controlled, and results in subtantial reduction in blocking tendencies.

DETAILED DESCRIPTION OF THE INVENTION

Our invention is applicable to normally tacky polymers in general. Our method and discovery comprises treating a normally tacky particulate-form polymer with an anti-blocking treatment comprising a water emulsion of a silicone fluid with an alkali metal higher carboxylate. The silicone fluids or siloxanes can be broadly described as polydihydrocarbylsiloxanes or dihydrocarbylpolysiloxanes. The alkali metal carboxylates are the alkali metal salts of monocarboxylic acids containing at least 12 carbon atoms per molecule.

The anti-blocking water emulsion treating composition is applied to the otherwise normally tacky particulate-form polymer by spraying, sprinkling, pouring, immersion, or the like, after which the water can be readily removed by any convenient means to further recover a dry particulate-form polymer of substantially reduced blocking tendency.

SYNTHETIC ELASTOMERS

Our invention is applicable broadly to normally-tacky polymers in particulate-form. The particulate-form includes crumb, pellets, granules, briquettes, pills, spheres, etc., of the polymer exhibiting tendencies to block, or agglomerate or stick together, particularly under conditions of storage pressure of bale-on-bale, which storage frequently is at somewhat elevated temperatures in storage warehouses. These normally-tacky particulate-form polymers include the polymers as prepared, as well as those modified by various types of treatment known to the art including hydrogenation, oxidation, expoxidation, and the like. The normally-tacky particulate-form polymers also include the polymers compounded or extended with various types of extenders, such as oil, and fillers, such as carbon black, silica, and the like.

The invention is broadly applicable to any polymer in particulate-form which is normally-tacky. The invention is particularly applicable to the elastomers, using the term in a broad sense to include any polymer, particularly synthetic polymers, exhibiting a tacky character in particle-form and having any elastomeric character, or derived from polymers having any elatomeric character by treatment such as by hydrogenation and the like, since such elastomers most commonly exhibit undesirable blocking tendencies.

The elastomers typically and exemplarily include ethylene-propylene-diene terpolymers; ethylene-propylene copolymers; polyisobutylene; natural rubber; various synthetic polymers of conjugated dienes broadly including homopolymers such as polybutadiene and polyisoprene, copolymers of two or more conjugated dienes such as polybutadiene/isoprene, copolymers of at least one conjugated diene with at least one monovinyl arene such as butadiene/styrene copolymers, isoprene/styrene copolymers; and the like; prepared by any means practiced in the polymeric arts including emulsion, solution, or mass polymerization.

Presently preferred for many uses in the compounding of various aticles including tires, carcass compositions, tread compositions, viscosity index improvers in lube oils, and the like, are the copolymers of conjugated dienes with monovinyl-substituted aromatic hydrocarbons, such as the linear and branched block copolymers described in U.S. Pat. Nos. 3,251,905, 3,281,383, and 3,639,521, as well as hydrogenated derivatives thereof such as the hydrogenated butadiene/styrene copolymers described in U.S. Pat. No. 3,554,911.

Among these presently preferred synthetic elastomers are those prepared from conjugated dienes of 4 to 12 carbon atoms per molecule, preferably those of 4 to 8 carbon atoms per molecule, for commercial purposes, with monovinyl-substituted aromatic compounds containing 8 to 12, more preferably for commercial availability 8 to 10, carbon atoms per molecule. Such elastomers generally contain at least about 30 parts by weight of polymerized conjugated diene per 100 parts by weight of copolymer, more usually about 30 to 90 parts by weight polymerized conjugated diene, more preferably at least about 50 to 90 parts by weight polymerized conjugated diene, and corresponding amounts of copolymerized monovinyl-substituted aromatic compound.

One skilled in the art will recognize that within the presently preferred synthetic elastomers considerable variation in properties will exist in copolymers with varying relative monomer compositions, molecular weights, block lengths, and the like. For purposes of this invention, the term "elastomer" is appropriately applied to the useful modified and unmodified natural and synthetic polymers even though the degree of elastomeric character may vary widely and even in some instances be substantially less than for polymers that would be conventionally defined as elastomers.

Examples of such conjugated dienes include 1,3-butadiene, isoprene, piperylene, 2-methyl-1,3-pentadiene, 3,4-dimethyl-1,3-hexadiene, 4,5-diethyl-1,3-octadiene, and the like. Examples of monovinyl-substituted aromatic hydrocarbons include styrene, 1-vinylnaphthalene, 2-vinylnaphthalene, 3-methylstyrene, and the like. Presently preferred are random and block, linear or branched, copolymers of butadiene/styrene, or of isoprene/styrene, and their at least partially hydrogenated derivatives. Particular reference is made to the methods of preparation of such polymers referred to in the U.S. Patents referred to hereinabove as methods for preparing particularly suitable copolymers.

Presently particularly suitable for lubricating oil additives are those viscosity index improvers having a molecular weight in the range of about 25,000 to 125,000 containing about 30 to 44 parts by weight butadiene per 100 parts by weight of total monomers wherein the comonomer is styrene. These molecular weight values are based on number average molecular weights. Such copolymers are hydrogenated for lube oil uses to the extent of substantial reduction of olefinic double bonds, leaving substantially unhydrogenated aromatic unsaturation.

ANTISTICKING COMPOSITIONS

The antisticking or antiblocking treatments employed in accordance with the method and process of our invention to inhibit agglomeration or sticking of the normally-tacky particle-form polymers comprises a silicone/alkali metal monocarboxylate/water emulsion wherein the silicone is a normally fluid polyhydrocarbylsiloxane, and the alkali metal monocarboxylate contains at least 12 carbon atoms per molecule.

The normally fluid silicones employed in our antiblocking treating compositions are those referred to in the art as polydihydrocarbylsiloxanes or dihydrocarbylpolysiloxanes, preferably for commercial availability the polydialkylsiloxanes, and of these for similar reasons the polydimethylsiloxanes are most preferred. These siloxanes have the general repeating structure

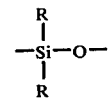

wherein R is a hydrocarbon radical, in which one of the R groups can be hydrogen, but preferably both R groups are hydrocarbon. R can be any monovalent hydrocarbon radical such as alkyl, cycloalkyl, aryl, alkaryl, aralkyl, though preferred for emulsion purposes are those wherein R is an alkyl radical of 1 to 6 carbon atoms, and presently the methyl radical is most preferred for commercial availability. The polydimethylsiloxanes can be further represented by the formula

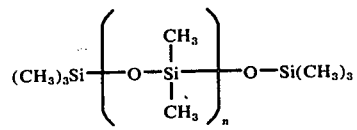

wherein $n$ is an integer of about 5 to 1,000.

Commercially available silicone materials are suitable. These generally exhibit a viscosity range of about 100 to 10,000 centistokes as measured at 25° C. according to ASTM D-445, Appendix C, presently preferably for convenience in handling and effectiveness in the range of about 500 to 5,000 centistokes. Such silicone fluids are commercially available, such as those from Dow Corning presently designated as DC 200.

Alkali metal higher carboxylates useful as emulsifiers in preparing the anti-sticking treating compositions according to the process of our invention comprise the alkali metal salts of higher monocarboxylates of at least 12 carbon atoms per molecule, presently preferred for commercial availability about 12 to 26 carbon atoms per molecule, more preferably also for commercial convenience 14 to 20 carbon atoms per molecule, including the saturated and unsaturated higher carboxylates, alone or in admixture. The alkali metal moieties include lithium, sodium, potassium, rubidium, or cesium, though it is readily apparent for most purposes that the lithium, sodium, potassium, will be most frequently used for commercial availability, alone or in admixture.

Examples of the alkali metal higher carboxylates include sodium laurate, potassium palmitate, potassium stearate, sodium stearate, sodium behenate, potassium cerotate, potassium oleate, lithium linoleate, potassium eleostearate, as well as the rubidium or cesium salts of such carboxylates, and the like, and mixtures thereof.

Alkali metal higher carboxylates can be used as such in our invention as a previously prepared carboxylate, or can be prepared in situ in the preparation of the silicone fluid/water emulsion by addition of the appropriate alkali metal hydroxide and fatty acid. For in situ preparation of the alkali metal higher carboxylate, the alkali metal hydroxide and fatty acid generally should be employed in a molar ratio in the range of about 0.75/1 to 1.25/1, respectively.

The emulsion employed in the anti-sticking treatment according to our invention can vary widely as to relative amounts of each component. As exemplary, we suggest about 1 to 50 percent by weight silicone fluid based on total weight of emulsion (silicone fluid, water, and carboxylate), and presently preferably for convenience and effectiveness about 2.5 to 15 weight percent silicone. The amount of the alkali metal higher carboxylate can vary widely, and as exemplary we suggest in the range of about 0.5 to 15 parts by weight per 100 parts by weight silicone, and presently preferably about 1 to 10 parts by weight.

The anti-sticking emulsion of our discovery can be prepared by an appropriate method known in the art. It is convenient and effective to prepare the emulsion in a high intensity mixer, such as a Waring Blender (Model PB-5A) or a Gifford Wood Eppenbach Mixer (Model 1½), by first adding water to the mixer followed by the alkali metal carboxylate or alkali metal hydroxide and fatty acid. The silicone fluid then can be added rapidly to the mixer with vigorous mixing in an amount sufficient to result in a concentrated (such as about 50 weight percent) emulsion. After thorough agitation of the concentrated emulsion further water can be added with vigorous mixing to provide a lean emulsion of the desired final concentration.

The amount of the novel anti-sticking emulsion utilized in the practice of our invention should be that small amount effective to provide the desired anti-block character to the particulate-form polymer, and can vary widely depending on factors such as type of elastomer, particle type and size, particle surface area, inherent tack of the polymer, expected storage conditions, etc. However, generally sufficient emulsion to provide from about 0.005 to 1 part by weight silicone fluid per 100 parts by weight polymer, presently preferably from about 0.02 to 0.5 part by weight silicone fluid, produces effectively satisfactory results.

The anti-sticking emulsion can be added to the particles of synthetic elastomer in any convenient manner such as spraying, sprinkling, pouring, and the like. Following treatment of the particulate polymer with the emulsion, it is usually desirable to remove the water to recover a dry particle-form elastomer. The water can be removed by any means known in the art, such as by warming in a forced air draft or at reduced pressure to evaporate the water, leaving relatively uniformly treated particles.

EXAMPLES

The Examples are intended to assist in a further understanding of our invention by those skilled in the art to which it pertains. The Examples are a portion of our disclosure. Thus, specific materials, conditions, concentrations, and the like, should be considered as illustrative for exemplary purposes, and not as limitative.

EXAMPLE I

The following runs illustrate the application of our invention in inhibiting agglomeration of extruded pellets of a normally-tacky polymer, a hydrogenated butadiene/styrene copolymer containing a weight ratio of 41/59 butadiene/styrene. The hydrogenated copolymer was prepared according to the general procedure described in U.S. Pat. No. 3,554,911. The butadiene/styrene copolymer was prepared in cyclohexane as solvent employing n-butyllithium as initiator and tetrahydrofuran as randomizer. Hydrogenation of the polymer in cyclohexane using nickel octoate reduced with triethylaluminum as catalyst resulted in approximately 1 weight percent (based on total polymer) residual olefinic unsaturation.

Pellets of 7.9 mm diameter and of either 1.6 to 3.2 mm length were prepared from wet crumb using a Welding Engineers Dewatering Rocket followed by subsequent drying of the wet pellets to less than one percent by weight residual moisture.

A test procedure was developed to compare the sticking tendency of the above-described particles with and also without the anti-sticking treatment of our invention. A sample container consisting of a section of poly(vinyl chloride) pipe 14 cm long and 7.6 cm diameter was positioned to stand an end in a 100 mm × 15 mm Petri dish cover. Sufficient polymer pellets were added to the sample container to fill it to a depth of 7.5 to 9 cm (generally about 200 gm of pellets). After covering the upper surface of the sample with a disc of 0.05 mm polyethylene film, a cylindrical steel weight of diameter to fit inside the sample container (approx. 7.6 cm) and 5.4 cm long weighing 1900 ± 25 gm was positioned inside the sample container to exert pressure (approx. 366 kg/m$^2$) on the pellets in the column, thus simulating stacking pressures. The assembly of sample, container, and weight was placed in an air oven at 50° C. for 90 hours. After the requisite heat treatment, the weight was removed from the container, and the sample in the container was allowed to cool to room temperature. If the pellets were free-flowing after such treatment, such observation was recorded. If the pellets were stuck together or agglomerated, the resultant cylinder of agglomerated pellets was carefully removed from the sample container and placed upright on the platform of a scale capable of measuring up to about 100 kg. With the palm of one hand, a steadily increasing downward force was applied to the top surface of the sample cylinder. The balance reading at the point of sample cylinder collapse was recorded as the sample crush strength. Sample crush strength results were reproducible to within ± 20 percent.

Treating agent emulsions were prepared by dissolving emulsifier in water, rapid addition of silicone fluid with vigorous mixing to make a concentrate of about 50 weight percent silicone fluid, thorough mixing, followed by dilution with water to obtain an emulsion of convenient concentration. In these runs, convenient concentrations were such that 1 to 2 parts by weight emulsion per 100 parts by weight polymer were applied to the polymer to provide the desired amount of silicone.

Treatment of the sample pellets with the various inventive and noninventive anti-sticking treatments before the above-described heat treatment was accomplished by adding the anti-sticking treatments to the particles of polymer in a polyethylene bag by means of a fine mist from a spray bottle in several applications with vigorous shaking of the sample bag between applications. The thus-treated polymer pellets were dumped onto aluminum trays for drying in the air at 50° C. (1 to 2 hours drying time). Midway through the drying step the polymer pellets were returned to the original polyethylene sample bag to remove any treating fluid remaining adhering to the bag walls.

Runs 1 through 21 employed a commercially available polydimethylsiloxane, Dow Corning 200 fluid, 1,000 centistokes viscosity. Inventive Runs 1 to 6 employed a potassium salt of a fatty acid mixture as emulsifier. Noninventive Runs 7 through 19 employed other emulsifiers. Runs 20 through 24 employed commercially available silicone/water emulsions which contained various emulsifiers. Control Run 25 was made with polymer pellets untreated with anti-sticking agent.

The results of inventive Runs 1 to 6 and noninventive Runs 7 to 25 are shown in Table I:

other emulsifiers such as sulfonates and polyethoxy alcohol did not inhibit the sticking characteristic of the polymer pellets in Runs 20–24 to the extent the inventive emulsion did in Runs 1–6. It will be noted in Runs 1 to 6 that the thinner pellets required more of the treating agent than did the thicker pellets to obtain comparable crush strengths. Run 25 shows the very high sticking tendency of the polymer pellets without an anti-sticking agent.

Other runs with sodium stearate, and with the sodium salt of the above-described fatty acid mixture as the emulsifiers in the silicone emulsion, also imparted anti-sticking characteristics to the above-described polymer pellets comparable to those of inventive Runs 1 to 6.

In order to describe the significance of the crush strength results in terms of handling characteristics, the following observations were made on polyethylene bags containing 2.3 kg of variously treated pellets. A crush strength of about 10 kg represents pellets which were a single agglomerated mass which retained its shape during gentle handling but which was easily broken down to individual pellets by hand crushing. A crush strength of about 22 kg represents an agglomerated mass which was not significantly disturbed by a 1.2 m drop to a concrete floor, but which could be broken down into small agglomerates and individual pellets by hand crushing. A crush strength of about 32 kg repre- Table I

| Run No. | Emulsifier | PHS[a] | Silicone, PHR[b] | Crush Strength (kg) 3.2 mm | 1.6 mm |
|---|---|---|---|---|---|
| 1 | KFA[c] | 2.5 | 0.05 | 11.3 | 36.3 |
| 2 | KFA | 2.5 | 0.1 | 6.4 | d |
| 3 | KFA | 2.5 | 0.25 | 0.5 | 9.5 |
| 4 | KFA | 6.5–8 | 0.05 | 5.0 | 20.9 |
| 5 | KFA | 6.5–8 | 0.1 | 2.7 | d |
| 6 | KFA | 6.5–8 | 0.25 | <0.5 | 5.0 |
| 7 | SMOS[e] | 5 | 0.25 | 12.7 | d |
| 8 | SMOS | 5 | 0.50 | d | 16.3 |
| 9 | SMOS | 10 | 0.25 | 9.1 | d |
| 10 | SMOS | 10 | 0.50 | 7.3 | 13.6 |
| 11 | SMOS | 20 | 0.1 | 13.6 | d |
| 12 | SMOS | 20 | 0.25 | 15.0 | d |
| 13 | SMOS | 20 | 0.50 | 14.5 | 15.4 |
| 14 | SPS[f] | 5 | 0.1 | 40.4 | d |
| 15 | SPS | 5 | 0.25 | 38.6 | d |
| 16 | SPS | 20 | 0.1 | 37.7 | d |
| 17 | SPS | 40 | 0.1 | 24.5 | d |
| 18 | SPS | 94 | 0.1 | 13.2 | d |
| 19 | SPS | 94 | 0.5 | 33.1 | d |
| 20 | Emulsion A[g] | | 0.05 | 79.8 | d |
| 21 | Emulsion A | | 0.25 | 73.5 | d |
| 22 | Emulsion B[h] | | 0.05 | 45.4 | d |
| 23 | Emulsion B | | 0.25 | 26.3 | d |
| 24 | Emulsion B | | 0.50 | 30.4 | 28.1 |
| 25 | None | | None | <90.7 | <90.7 |

[a]Parts by weight emulsifier per 100 parts by weight of silicone in emulsion.
[b]Parts by weight per 100 parts by weight polymer pellets.
[c]Potassium salt of mixed fatty acids containing 3 weight percent myristic acid, 30 weight percent palmitic acid, 23 weight percent stearic acid and 44 weight percent oleic acid.
[d]Not determined.
[e]Sodium mineral oil sulfonate (Morco H-62).
[f]Sodium petroleum sulfonate (Lubrizol OS-20625).
[g]Commercial aqueous emulsion containing Dow-Corning 200 fluid 1,000 centistoke, with less than 12.5 phs glycol fatty acid sodium alcohol sulfonate and other undisclosed but ineffective for our invention anionic emulsifiers (Dow-Corning 922A).
[h]Commercial aqueous emulsion containing 100 centistoke silicone and 8.6 phs octylphenoxypolyethoxy-ethanol (SWS E-99).
[i]Length of 7.9 mm diameter pellets.

The results of the runs as summarized in Table I above demonstrate that use of our silicone/water/higher carboxylate emulsions prepared using as emulsifier an alkali metal fatty acid salt (Runs 1 to 6) produced polymer pellets with effectively lower crush strength than the same silicone in aqueous emulsion with other emulsifiers (Runs 7 to 19) such as sulfonates at comparable levels of silicone and emulsifiers. Likewise, commercially available emulsions of silicones and sents an agglomerated mass which withstood repeated 1.2 m drops to a concrete floor and which was very difficult to break down to smaller agglomerates by hand.

EXAMPLE II

The following runs further illustrate the usefulness of our invention in inhibiting the sticking characteristics of several commercially available particulate-form branched block copolymers of butadiene and styrene.

Testing procedure, storage conditions, and sample preparation were as described in Example I. Solprene* 416X and Solprene* 475 are branched block copolymers of about 70/30 and 60/40 weight ratios of butadiene/styrene, respectively, with polystyrene end blocks, and polybutadiene internal blocks. Solprene 475 is extended with about 50 parts by weight naphthenic oil per 100 parts by weight copolymer.

Trademark — These polymers are available from Phillips Petroleum Company.

The anti-sticking emulsion employed was prepared and applied as described above according to the following recipe:

|  | Weight % |
|---|---|
| Silicone[a] | 12.4 |
| Fatty acid[b] | 0.24 |
| Potassium hydroxide | 0.076 |
| Water | 87.3 |

[a]Dow Corning 200 fluid, 1,000 centistokes.
[b]See footnote c of Table I for fatty acid composition.

Table II contains the test results using pellets of the above polymers of 6 mm diameter by 3 to 9 mm length.

Table II

| Run No. | Polymer | Silicone PHR | Crush Strength (kg) |
|---|---|---|---|
| 26 | 416X | none | 41 |
| 27 | 416X | 0.05[j] | 10 |
| 28 | 475 | 0.05[j] | 25 |
| 29 | 475 | 0.27[k] | 14 |

[j]Parent emulsion described above was further diluted with water to a final concentration of 2.5 weight percent silicone.
[k]Run 29 used the parent emulsion.

The results in Table II illustrate the effectiveness of our invention in inhibiting the sticking tendencies of particle-form elastomers. Run 27 of the invention demonstrates the advantage of the invention compared to the use of no anti-sticking agent in comparative Run 26. Runs 28 and 29 of the invention illustrate that the use of increasing amounts of anti-sticking agent on pellets of oil extended polymer further decreases sticking tendencies.

The disclosure, including data, illustrate the value and effectiveness of our invention. The examples, the knowledge and background of the field of the invention and general principles of chemistry and other applicable sciences have formed the bases from which the broad descriptions of the invention including the ranges of conditions and generic groups of operant components have been developed, which have formed the bases for our claims here appended.

We claim:

1. The process which comprises treating a normally-tacky particulate polymer with an anti-block composition comprising water, an alkali metal salt of a monocarboxylate containing at least 12 carbon atoms per molecule, and a normally fluid silicone which is a polyhydrocarbylsiloxane and thereafter removing the water,
   wherein said anti-block composition contains about 1 to 50 weight percent silicone, and about 0.5 to 15 parts by weight alkali metal monocarboxylate per 100 parts by weight silicone, wherein said process provides about 0.005 to 1 part by weight silicone per 100 parts by weight polymer effective to substantially reduce the agglomerating tendencies of said particulate polymer under storage conditions.

2. The process according to claim 1 wherein said anti-block composition contains about 2.5 to 15 weight percent of said silicone, and about 1 to 10 parts by weight of said alkali metal salt of a monocarboxylate per 100 parts by weight silicone.

3. The process according to claim 1 wherein said effective amount of said anti-block treating composition is sufficient to provide about 0.02 to 0.5 part by weight silicone per 100 parts by weight polymer.

4. The process according to claim 1 wherein said polyhydrocarbylsiloxane contains the repeating structure

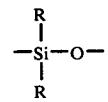

wherein at least one R group is a hydrocarbon radical and one R group can be hydrogen, and where said hydrocarbon radical is alkyl, cycloalkyl, aryl, alkaryl, aralkyl, or combination.

5. The process according to claim 4 wherein said particulate-form polymer is characterized as an elastomer.

6. The process according to claim 5 wherein said elastomer is natural rubber, ethylene/propylene/diene terpolymer, ethylene/propylene copolymer, polyisobutylene, butadiene/styrene copolymer, isoprene/styrene copolymer, polybutadiene, or polyisoprene.

7. The process according to claim 5 wherein said elastomer is a synthetic elastomer and is a conjugated diene polymer of a conjugated diene containing 4 to 12 carbon atoms per molecule.

8. The process according to claim 7 wherein said conjugated diene polymer is a copolymer of a conjugated diene polymer with a monovinyl-substituted aromatic hydrocarbon containing 8 to 12 carbon atoms per molecule, said elastomer contains about 30 to 90 parts by weight of copolymerized conjugated diene.

9. The process according to claim 8 wherein said conjugated diene/monovinyl-substituted aromatic hydrocarbon copolymer is a hydrogenated copolymer hydrogenated sufficiently to substantially saturate olefinic double bonds without substantial hydrogenation of aromatic double bonds.

10. The process according to claim 9 wherein each R is alkyl containing 1 to 6 carbon atoms.

11. The process according to claim 10 wherein each R is methyl, and said polyhydrocarbylsiloxane is a polydimethylsiloxane represented by the formula

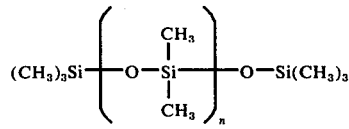

wherein $n$ is an integer of 5 to 1,000.

12. The process according to claim 11 wherein said silicone is further characterized by a viscosity in the range of 100 to 10,000 centistokes.

13. The process according to claim 12 wherein said alkali metal salt of a monocarboxylate is selected from the group consisting of sodium laurate, potassium palmitate, potassium stearate, sodium stearate, sodium behenate, potassium cerotate, potassium oleate, lithium linoleate, potassium eleostearate, or mixture.

14. The process according to claim 13 wherein said synthetic elastomer is a hydrogenated butadiene/styrene copolymer.

15. The process according to claim 14 wherein said anti-block composition contains about 2.5 to 15 weight percent silicone and about 1 to 10 parts by weight alkali metal salt of a monocarboxylate per 100 parts by weight silicone, wherein said carboxylate comprises sodium stearate, and said silicone is a polydimethylsiloxane exhibiting a viscosity of about 500 to 5,000 centistokes.

16. The process according to claim 14 wherein said anti-block composition contains about 2.5 to 15 weight percent silicone and about 1 to 10 parts by weight alkali metal salt of a monocarboxylate per 100 parts by weight silicone, wherein said monocarboxylate comprises potassium palmitate, and said silicone is a polydimethylsiloxane exhibiting a viscosity of about 500 to 5,000 centistokes.

17. The process according to claim 14 wherein said anti-block composition contains about 2.5 to 15 weight percent silicone and about 1 to 10 parts by weight alkali metal salt of a monocarboxylate per 100 parts by weight silicone, wherein said monocarboxylate comprises potassium oleate, and said silicone is a polydimethylsiloxane exhibiting a viscosity of about 500 to 5,000 centistokes.

18. A particulate-form polymer exhibiting anti-block properties prepared by the process which comprises treating a normally-tacky particulate-form polymer with an effective amount of an anti-block treating composition emulsion consisting essentially of an emulsion of water, an alkali metal salt of a monocarboxylate of at least 12 carbon atoms per molecule, and a silicone which is a polyhydrocarbylsiloxane and thereafter removing the water, wherein said anti-block treating emulsion contains about 1 to 50 weight percent silicone and about 0.5 to 15 parts by weight alkali metal monocarboxylate per 100 parts by weight silicone, and wherein said effective amount provides about 0.005 to 1 part by weight silicone per 100 parts by weight polymer, thereby producing a particulate-form polymer of reduced blocking character.

19. The composition according to claim 18 wherein said anti-blocking composition contains about 2.5 to 15 weight percent silicone and about 1 to 10 parts by weight of alkali metal salt of a monocarboxylate per 100 parts by weight silicone.

20. The composition according to claim 19 wherein said effective amount of said anti-block treating composition is sufficient to provide about 0.02 to 0.5 part by weight silicone per 100 parts by weight polymer.

21. The composition according to claim 19 wherein said polyhydrocarbylsiloxane contains the repeating structure

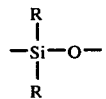

wherein at least one R group is a hydrocarbon radical and one R group can be hydrogen, and where said hydrocarbon radical is alkyl, cycloalkyl, aryl, alkaryl, aralkyl, or combination.

22. The composition according to claim 21 wherein said particulate-form polymer is characterized as an elastomer.

23. The composition according to claim 22 wherein said elastomer is natural rubber, ethylene/propylene/diene terpolymer, ethylene/propylene copolymer, polyisobutylene, butadiene/styrene copolymer, isoprene/styrene copolymer, polybutadiene, or polyisoprene.

24. The composition according to claim 22 wherein said elastomer is a synthetic elastomer and is a conjugated diene homopolymer or copolymer, or is a conjugated diene/monovinyl-substituted aromatic hydrocarbon copolymer, wherein said conjugated diene contains 4 to 12 carbon atoms per molecule, and said monovinyl-substituted aromatic hydrocarbon contains 8 to 12 carbon atoms per molecule, and where said elastomer is said conjugated diene/monovinyl-substituted aromatic hydrocarbon copolymer, said copolymer contains about 30 to 90 parts by weight of copolymerized conjugated diene.

25. The composition according to claim 24 wherein said elastomer is said conjugated diene/monovinyl-substituted aromatic hydrocarbon copolymer further characterized as a hydrogenated copolymer hydrogenated sufficiently to substantially saturate olefinic double bonds without substantial hydrogenation of aromatic double bonds.

26. The composition according to claim 24 wherein each R is alkyl containing 1 to 6 carbon atoms.

27. The composition according to claim 26 wherein each R is methyl, and said polyhydrocarbylsiloxane is a polydimethylsiloxane represented by the formula

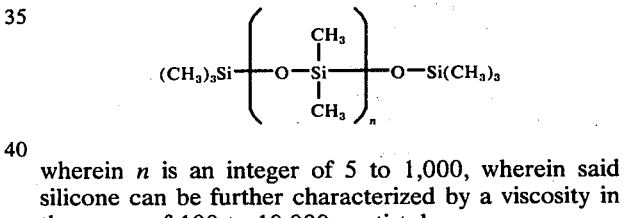

wherein n is an integer of 5 to 1,000, wherein said silicone can be further characterized by a viscosity in the range of 100 to 10,000 centistokes.

28. The composition according to claim 27 wherein said alkali metal monocarboxylate is selected from the group consisting of sodium laurate, potassium palmitate, potassium stearate, sodium stearate, sodium behenate, potassium cerotate, potassium oleate, lithium linoleate, potassium eleostearate, or mixture.

29. The composition according to claim 28 wherein said synthetic elastomer is a hydrogenated butadiene/styrene copolymer.

30. The composition according to claim 29 wherein said anti-block composition contains about 2.5 to 15 weight percent silicone and about 1 to 10 parts by weight alkali metal of a higher monocarboxylate per 100 parts by weight silicone, wherein said monocarboxylate comprises sodium stearate, and said silicone is a polydimethylsiloxane exhibiting a viscosity of about 500 to 5,000 centistokes.

31. The composition according to claim 29 wherein said anti-block composition contains about 2.5 to 15 weight percent silicone and about 1 to 10 parts by weight alkali metal salt of a monocarboxylate per 100 parts by weight silicone, wherein said monocarboxylate comprises potassium palmitate, and said silicone is a polydimethylsiloxane exhibiting a viscosity of about 500 to 5,000 centistokes.

32. The composition according to claim 29 wherein said anti-sticking composition contains about 2.5 to 15 weight percent silicone, and about 1 to 10 parts by weight alkali metal salt of a monocarboxylate per 100 parts by weight silicone, wherein said monocarboxylate comprises potassium oleate, and said silicone is a polydimethylsiloxane exhibiting a viscosity of about 500 to 5,000 centistokes.

* * * * *